US010409242B2

(12) United States Patent
Bliss et al.

(10) Patent No.: US 10,409,242 B2
(45) Date of Patent: *Sep. 10, 2019

(54) ELECTRONIC OPERATOR INTERFACE BASED CONTROLLER AND DEVICE AUTOMATIC DOWNLOADS

(71) Applicant: Rockwell Automation Technologies, Inc., Mayfield Heights, OH (US)

(72) Inventors: Ronald E. Bliss, Twinsburg, OH (US); Brian R. Oulton, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,261

(22) Filed: Jun. 8, 2018

(65) Prior Publication Data

US 2018/0292793 A1 Oct. 11, 2018

Related U.S. Application Data

(63) Continuation of application No. 15/271,172, filed on Sep. 20, 2016, now Pat. No. 10,018,978, which is a
(Continued)

(51) Int. Cl.
*G06F 19/00* (2018.01)
*G05B 15/02* (2006.01)
(Continued)

(52) U.S. Cl.
CPC ........... *G05B 15/02* (2013.01); *G05B 19/056* (2013.01); *G05B 19/409* (2013.01); *G06F 8/65* (2013.01);
(Continued)

(58) Field of Classification Search
CPC combination set(s) only.
See application file for complete search history.

(56) References Cited

U.S. PATENT DOCUMENTS 4,558,413 A 12/1985 Schmidt et al.
4,908,746 A 3/1990 Vaughn
(Continued)

FOREIGN PATENT DOCUMENTS

EP 1284446 2/2003
EP 1403782 3/2004
WO 2005047992 5/2005

OTHER PUBLICATIONS

U.S. Appl. No. 15/271,172, filed Sep. 20, 2016.
(Continued)

*Primary Examiner* — Kidest Bahta
(74) *Attorney, Agent, or Firm* — Amin, Turocy & Watson, LLP

(57) ABSTRACT

An electronic operator interface based controller and device automatic downloads are provided. An electronic operator interface can determine if control logic or content used by an industrial controller has been updated, changed, or otherwise modified. If the content has been modified, then the electronic operator interface can automatically obtain the content and store a back-up copy in memory. Additionally or alternatively, the electronic operator interface can periodically update a backup copy of the content. Furthermore, the electronic operator interface can determine if the controller has lost its content, and restore the content from the most recent version saved in memory.

20 Claims, 12 Drawing Sheets

Related U.S. Application Data continuation of application No. 13/918,483, filed on Jun. 14, 2013, now Pat. No. 9,459,602, which is a continuation of application No. 12/410,275, filed on Mar. 24, 2009, now Pat. No. 8,489,210.

(51) Int. Cl.

| | | |
|---|---|---|
| *G05B 19/05* | (2006.01) | |
| *G06F 8/65* | (2018.01) | |
| *G06F 11/14* | (2006.01) | |
| *G05B 19/409* | (2006.01) | |
| *G06F 21/44* | (2013.01) | |

(52) U.S. Cl.
CPC ......... *G06F 11/1441* (2013.01); *G06F 21/44* (2013.01); *G05B 2219/13197* (2013.01); *G05B 2219/31124* (2013.01); *G05B 2219/31333* (2013.01)

(56) References Cited

U.S. PATENT DOCUMENTS

| | | | |
|---|---|---|---|
| 4,942,552 A | | 7/1990 | Merrill et al. |
| 5,508,909 A | | 4/1996 | Maxwell et al. |
| 5,689,726 A | | 11/1997 | Lin |
| 5,764,992 A | | 6/1998 | Kullick et al. |
| 5,805,889 A | | 9/1998 | Van De Vanter |
| 5,845,095 A | * | 12/1998 | Reed ................. G06F 9/4411 710/104 |
| 6,151,643 A | | 11/2000 | Cheng et al. |
| 6,201,996 B1 | | 3/2001 | Crater et al. |
| 6,272,678 B1 | | 8/2001 | Imachi et al. |
| 6,282,709 B1 | | 8/2001 | Reha et al. |
| 6,353,926 B1 | * | 3/2002 | Parthesarathy .......... G06F 8/65 707/999.202 |
| 6,360,362 B1 | | 3/2002 | Fichtner et al. |
| 6,397,229 B1 | | 5/2002 | Menon et al. |
| 6,401,239 B1 | | 6/2002 | Miron |
| 6,408,233 B1 | | 6/2002 | Solomon et al. |
| 6,493,871 B1 | | 12/2002 | McGuire et al. |
| 6,622,302 B1 | | 9/2003 | Delaney et al. |
| 6,631,386 B1 | | 10/2003 | Arun et al. |
| 6,687,901 B1 | | 2/2004 | Imamatsu |
| 6,801,813 B2 | | 10/2004 | Kay et al. |
| 6,801,920 B1 | | 10/2004 | Wischinski |
| 6,819,960 B1 | | 11/2004 | McKelvey et al. |
| 7,024,527 B1 | | 4/2006 | Ohr |
| 7,086,009 B2 | | 8/2006 | Resnick et al. |
| 7,089,530 B1 | | 8/2006 | Dardinski et al. |
| 7,107,408 B2 | | 9/2006 | Glasco |
| 7,117,052 B2 | * | 10/2006 | Lucas ............. G05B 19/41845 700/83 |
| 7,130,704 B2 | | 10/2006 | McKelvey et al. |
| 7,222,131 B1 | | 5/2007 | Grewal et al. |
| 7,266,574 B1 | | 9/2007 | Boudrie et al. |
| 7,386,755 B2 | | 6/2008 | Eguchi et al. |
| 7,659,828 B2 | | 2/2010 | Wehrs et al. |
| 7,673,297 B1 | | 3/2010 | Arsenault et al. |
| 7,675,406 B2 | | 3/2010 | Baier et al. |
| 7,730,450 B2 | | 6/2010 | Mercer |
| 8,209,540 B2 | | 6/2012 | Brouwer et al. |
| 8,286,154 B2 | | 10/2012 | Kaakani et al. |
| 8,341,122 B2 | | 12/2012 | Sawdon et al. |
| 8,578,005 B1 | | 11/2013 | Breau et al. |
| 8,788,071 B2 | | 7/2014 | Lucas et al. |
| 2002/0169850 A1 | | 11/2002 | Batke et al. |
| 2003/0182321 A1 | | 9/2003 | Ouchi |
| 2003/0188303 A1 | * | 10/2003 | Barman ................... G06F 8/64 717/170 |
| 2004/0010327 A1 | | 1/2004 | Terashima et al. |
| 2004/0015953 A1 | | 1/2004 | Vincent |
| 2004/0037156 A1 | * | 2/2004 | Yoneda ................. G06F 13/28 365/232 |
| 2004/0188511 A1 | | 9/2004 | Sprigg et al. |
| 2005/0155043 A1 | | 7/2005 | Schulz et al. |
| 2006/0095855 A1 | | 5/2006 | Britt et al. |
| 2006/0178757 A1 | | 8/2006 | Grgic et al. |
| 2006/0236083 A1 | | 10/2006 | Fritsch et al. |
| 2006/0259500 A1 | | 11/2006 | Hood et al. |
| 2006/0259871 A1 | | 11/2006 | Washington et al. |
| 2007/0118617 A1 | | 5/2007 | Lee et al. |
| 2007/0208440 A1 | | 9/2007 | Bliss et al. |
| 2008/0086513 A1 | | 4/2008 | O'Brien |
| 2008/0275921 A1 | | 11/2008 | Gunabalasubramaniam et al. |
| 2008/0301417 A1 | * | 12/2008 | Law ...................... G06F 9/3863 712/227 |
| 2009/0006640 A1 | | 1/2009 | Brouwer et al. |
| 2009/0133012 A1 | | 5/2009 | Shih |
| 2009/0204958 A1 | | 8/2009 | Kornmeier |
| 2012/0096441 A1 | * | 4/2012 | Law ................... G06F 11/3644 717/127 |

OTHER PUBLICATIONS

U.S. Appl. No. 13/918,483, filed Jun. 14, 2013.
U.S. Appl. No. 12/410,275, filed Mar. 24, 2009.
Office Action dated Nov. 22, 2011 for U.S. Appl. No. 12/410,275, 18 pages.
Office Action dated May 1, 2012 for U.S. Appl. No. 12/410,275, 20 pages.
Office Action dated Oct. 30, 2012 for U.S. Appl. No. 12/410,275, 25 pages.
Non-Final Office Action dated Dec. 5, 2014 for U.S. Appl. No. 13/918,483, 29 pages.
European Office Action dated Feb. 11, 2014 for European Application No. 10157541.3-1087, 10 pages.
Allen-Bradley, "Logix5000 Motion Modules". User Manual, Rockwell Automation, Publication 1756-UM006G-EN-P, May 2005. 16 pages.
European Office Action dated Apr. 3, 3013 for European Application No. 10157541.3-1807, 6 pages.
European Office Action dated Mar. 20, 2014 for European Application No. 10157541.3-1807, 17 pages.
Final Office Action dated Apr. 30, 2015 for U.S. Appl. No. 13/918,483, 25 pages.
Non-Final Office Action dated Apr. 24, 2015 for U.S. Appl. No. 13/918,483, 19 pages.
Non-Final Office Action dated Jan. 15, 2016 for U.S. Appl. No. 13/918,483, 32 pages.
Notice of Allowance for U.S. Appl. No. 13/918,483, dated May 26, 2016, 13 pages.
Non-Final Office Action for U.S. Appl. No. 15/271,172, dated Jan. 27, 2017, 37 pages.
Final Office Action for U.S. Appl. No. 15/271,172, dated Jun. 20, 2017, 18 pages.
Notice of Allowance for U.S. Appl. No. 15/271,172 dated Mar. 15, 2018, 14 pages.
Non-Final Office Action for U.S. Appl. No. 15/271,172, dated Oct. 2, 2017, 10 pages.

* cited by examiner

ELECTRONIC OPERATOR INTERFACE BASED CONTROLLER AND DEVICE AUTOMATIC DOWNLOADS

CROSS-REFERENCE TO RELATED APPLICATIONS

This application claims priority to each of, and is a continuation of, U.S. patent application Ser. No. 15/271,172 (now U.S. Pat. No. 10,018,978), filed Sep. 20, 2016, and entitled "ELECTRONIC OPERATOR INTERFACE BASED CONTROLLER AND DEVICE AUTOMATIC DOWNLOADS," which is a continuation of U.S. patent application Ser. No. 13/918,483 (now U.S. Pat. No. 9,459,602), filed Jun. 14, 2013, and entitled "ELECTRONIC OPERATOR INTERFACE BASED CONTROLLER AND DEVICE AUTOMATIC DOWNLOADS," which is a continuation of U.S. patent application Ser. No. 12/410,275 (now U.S. Pat. No. 8,489,210), filed Mar. 24, 2009, and entitled "ELECTRONIC OPERATOR INTERFACE BASED CONTROLLER AND DEVICE AUTOMATIC DOWNLOADS," the entireties of which applications are hereby incorporated herein by reference.

TECHNICAL FIELD

The subject innovation relates generally to industrial controls, and more particularly to electronic operator interface based controller and device automatic downloads.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

Additionally, electronic operator interfaces (EOI) are enhanced computer display devices that can include a plurality of operator input means, such as touch screens, keypads, and so forth. EOIs are therefore capable of both displaying information, and receiving inputs from operators. Typically, EOIS are in communication with one or more industrial controllers, and provide graphical and/or text displays of the control system and statuses for various associated components. Therefore, EOIs enable operators to interact with control systems by displaying control system data and accepting operator inputs.

In the past, manufacturing equipment was often controlled with large and complex circuitry that included enormous amounts of relay logic. These specialized circuits were difficult to update and/or modify, and may have only been understood by a small group of users outside of the designers. Modern industrial controllers allow for fast and efficient creation of control logic that can be generated, understood, and/or modified by a much larger number of potential users. However, the increased ease of use and access can also lead to the existence of multiple versions of the same control logic within a project or organization.

When there are multiple versions of the same control logic present among a group of users, a situation can arise where none of the users is aware of, or has access to, the most recent version. Consequently, one user may overwrite another user's updates, because the first user believed that he/she was working on the most recent version of the control logic. In addition, if the only trusted version is stored on the industrial controller, and the controller fails, then numerous updates and modifications may be lost.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more aspects of the subject innovation, various aspects are described in connection with electronic operator interface based controller and device automatic downloads. According to related aspects a system for backing up industrial controller content is provided. The system includes an electronic user interface that can dynamically or periodically obtain the control content from the industrial controller, and store the control content in memory.

Another aspect relates to a system for storing content in an electronic operator interface. The electronic operator interface includes an audit component that determines a status of data contained in at least one of an industrial controller, Input/Output module, or a network device, wherein the data includes control logic in the industrial controller or configuration data in the Input/Output module or the network device, and a transfer component that acquires the data based at least in part on the status.

Yet another aspect relates to a method for dynamic content downloads. The method includes the steps of determining if content stored in a device has been modified, obtaining the content if it has been modified, and storing the modified content in memory.

Still another aspect relates to a system for dynamic content downloads. The system includes means for determining if control logic stored in a controller has been at least one of modified or lost, means for obtaining the control logic from the controller if it has been modified, and storing the modified content in memory, and means for sending control logic stored in memory to the controller if the control logic has been lost.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
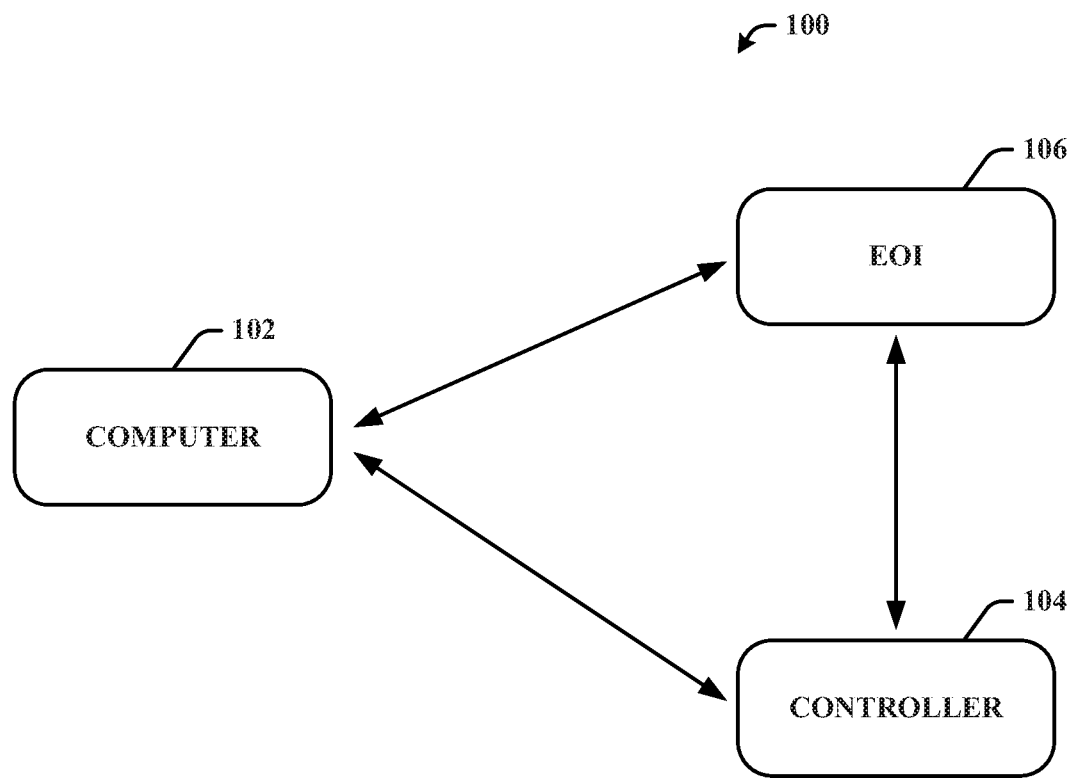
FIG. 1 illustrates an example system for design and implementation of industrial automation controls in accordance with the present innovation.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, an example system for design and implementation of industrial automation controls is shown in accordance with an aspect of the present innovation. The system 100 includes a computer 102, a controller 104, and an electronic operator interface (EOI) 106. The computer 102 can include most any computing device capable of generating, communicating, or maintaining content for the controller 104 or EOI 106, such as a laptop, a desktop, etc. The computer can communicate with the controller 104 and/or EOI 106 via most any suitable computing communication technique, including but not limited to a local area network (LAN), a wireless local area network (WLAN), a global communication infrastructure (e.g., such as the Internet), and so forth.

Typically, content (e.g., ladder diagram, function block diagram, structured text, sequential function charts, user interfaces, etc.) can be generated for the controller 104 and/or EOI 106 using the computer 102. For example, a user can generate a function block diagram for the controller 104 via the computer 102, wherein the function block diagram contains a set of instructions that can be executed by the controller 104. The controller 104 can be communicatively connected to one or more devices (e.g., motors, sensors, valves, pumps, etc.), and the instructions can be used to drive, control, or otherwise operate the devices.

The EOI 106 and controller 104 can communicate via most any suitable computing communication technique, including but not limited to LAN, WLAN, Internet, etc. The EOI 106 can include a touch screen operator interface, a control panel, and so forth. For example, if the EOI 106 is a touch screen operator interface, the user can generate a set of operator interfaces (e.g., graphical user interfaces, etc.) for the EOI 106, that enable an operator to adjust or otherwise interact with the instructions executed by the controller 104. For instance, the controller 104 can be communicatively connected to a motor Y, and contain a set of instructions for operating the motor Y. The EOI 106 can enable the operator to adjust a set of parameters (e.g., recipe) for operation of the motor Y, such as speed, and so forth.

Conventionally, the user loads content, applications, and so forth onto the controller 104 and EOI 106 separately. For example, at a first time the user can download a set of sequential function charts to the controller 104, and at a second time the user can download a set of operator interface display screens to the EOI 106 that enable the operator to interact with the instructions implemented by the sequential function charts in the controller 104. In addition, the content for the controller 104 and EOI 106 is typically stored on each device, respectively, and the computer 102. Moreover, a plurality of users can each download, update, or modify the content stored on the controller 104 or EOI 106 via a plurality of computers 102. For example, a first research and development (R&D) user can generate the initial content for the EOI 106 and controller 104. In addition, a plurality of maintenance users can update or modify the content stored in the EOI 106 and controller 104 to optimize performance, adjust for changing conditions, and so forth. Consequently, having multiple users generate and/or modify content can result in the only trustworthy version of the content being stored on the device (e.g., controller) itself.

Therefore, if the controller fails then the only trustworthy version of the content may be lost. In a typically failure scenario, the controller 104 is replaced, at least one of a plurality of users launches the development software via their computer 102, and the content is re-downloaded to the controller 104. However, if the user does not have or cannot find the most recent version of the content, then changes, optimizations, and so forth may be lost. Resulting in unnecessary re-engineering and/or content production efforts. In accordance with an aspect of the current innovation, content stored on the controller 104 can be automatically backed-up on the EOI 106, and/or automatically restored if necessary (discussed in greater detail below). It is to be appreciated that this is but a single example illustrated for brevity and clarity of explanation; those skilled in the art will be able to readily appreciate additional equivalent embodiments within the scope and spirit of the subject innovation.

Figure 2:
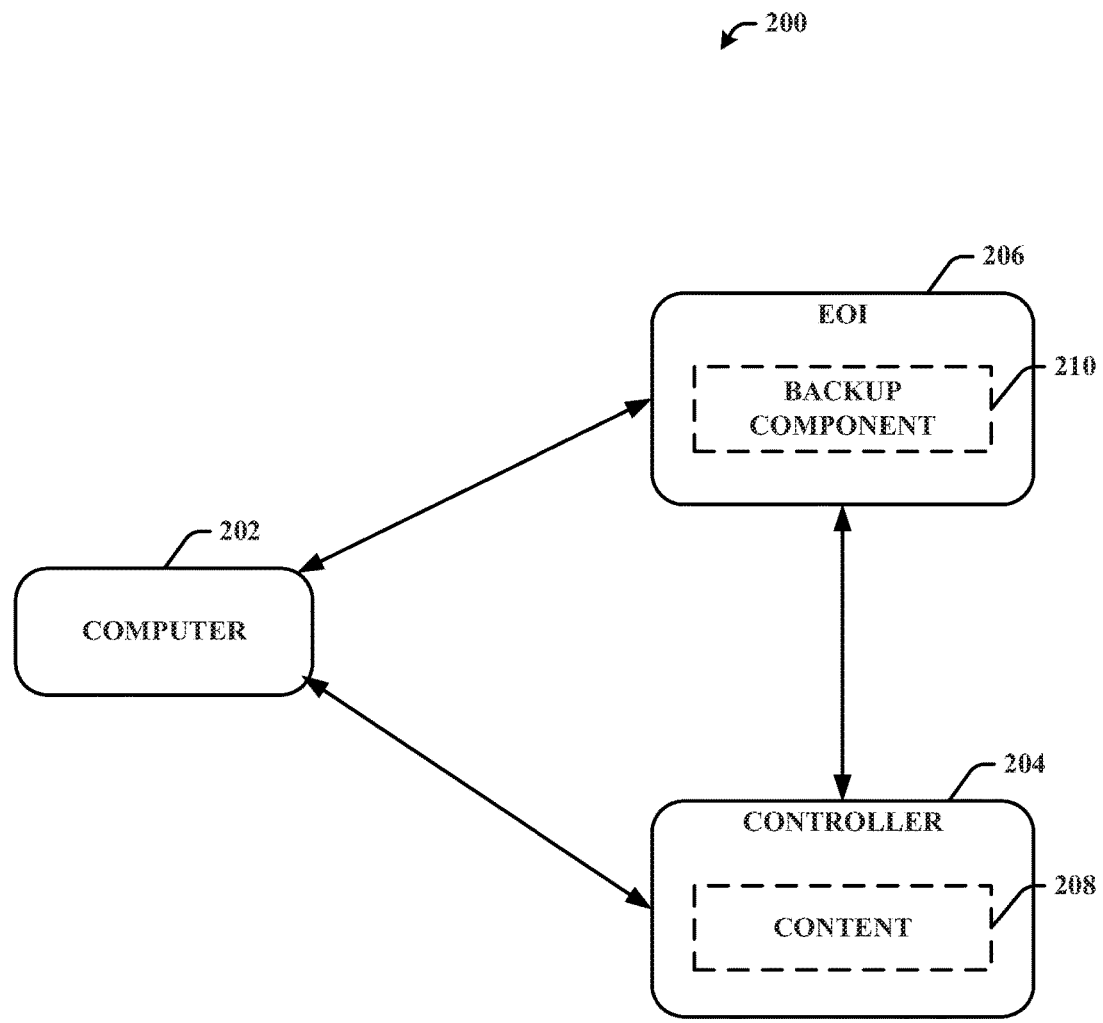
FIG. 2 illustrates an example system for automatic backup and/or restoration of industrial automation controls in accordance with the present specification.

Turning now to FIG. 2, an example system for automatic backup and/or restoration of industrial automation controls is shown in accordance with an aspect of the present innovation. The system 200 includes a computer 202, a controller 204, and an electronic operator interface (EOI) 206. As discussed previously, the computer 204 can be most any computing device suitable for generating, communicating, or maintaining controller content for the controller 204 and/or EOI 206. In addition, it is to be appreciated that the system 200 can include a plurality of computers 202.

In operation, a user can generate controller content 208 for the controller 204 via the computer 202, wherein the computer 202, controller 204, and EOI 206 can communicate via most any suitable communication protocol, such as a LAN, WLAN, global communication network (e.g., such as the Internet), an Ethernet connection, a proprietary communication protocol, and so forth. The controller content (e.g., content, control logic, etc.) 208 can include, for example, letter diagrams, function block diagrams, structured texts, sequential function charts, and so forth that can be executed by the controller 204 to control one or more devices (not shown). The EOI 206 includes a backup component 210 that can determine, perceive, or otherwise detect when the content 208 has been updated or modified (e.g., a newer version), and can obtain and store the newer version of the content 208.

Additionally, the backup component 210 can determine when the controller 204 does not have the most recent version of the content 208, and can restore the content 208 from the backup. For instance, if the controller 204 fails and is subsequently replaced, the replacement controller 204 will not contain the content 208. The backup component 210 can detect that the replacement controller 204 does not contain the content 208 and restore the content 208 from the most recent backed-up version. The backup component 210 can download the content 208 from the controller 204 periodically (e.g., daily, weekly, monthly, etc.) and/or dynamically (as previously discussed).

Figure 3:
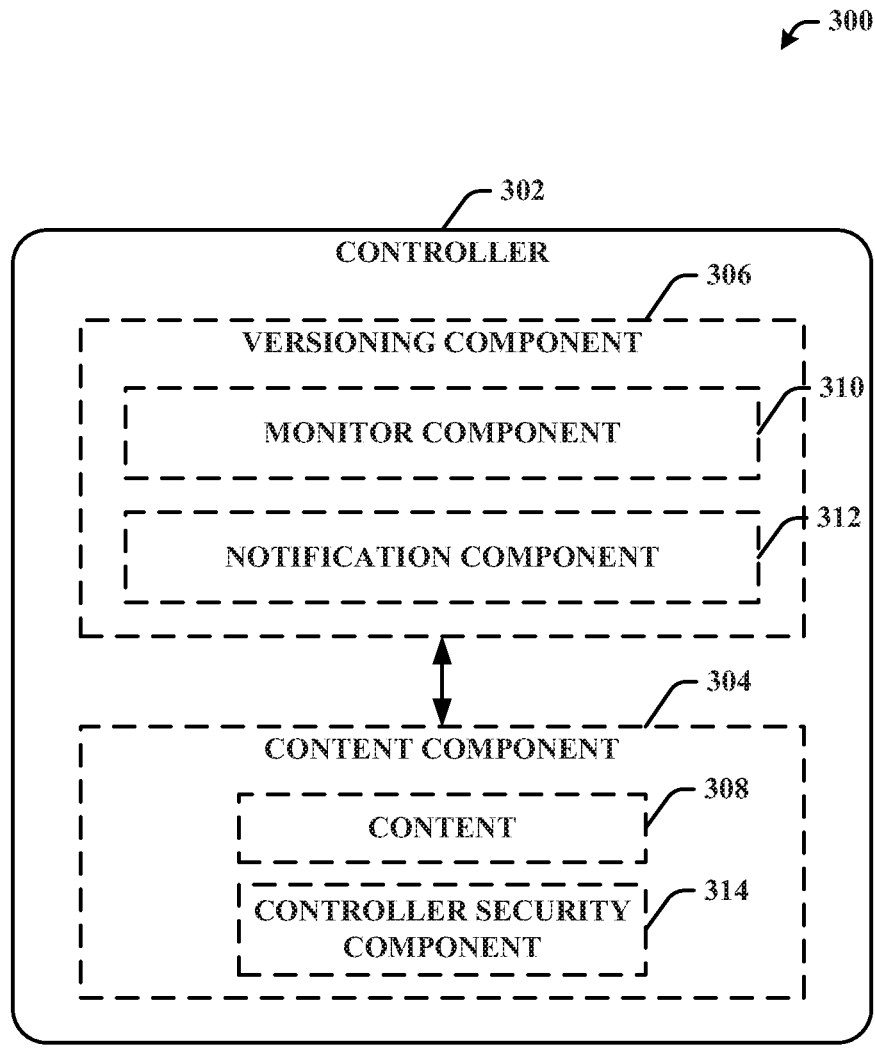
FIG. 3 illustrates an example general component block diagram of an industrial controller in accordance with the present specification.

FIG. 3 illustrates an example industrial automation controller in accordance with an aspect of the subject innovation. The controller 302 can include most any digital computing device used for automation of electromechanical processes, such as a programmable logic controller, and so forth. The controller 302 can include a content component 304, and a versioning component 306. The content component 304 maintains, saves, or otherwise stores content 308 for execution by the controller 302. The content component 304 can obtain content 308 from a plurality of sources, such as a computer (e.g., laptop, desktop, mobile device, etc.) via a LAN, WLAN, the Internet, and so forth (discussed supra).

The content 308 can include but is not limited to ladder diagrams, function block diagrams, structured text, sequential function charts, computer executable code, text files, databases, and so forth. For example, the content 308 can include a chunk of computer executable code that details the operation of one or more electromechanical devices on a production line, and the controller 302 can execute the commands in the code based on a set of inputs obtained from the production line and/or an electronic operator interface (as previously discussed).

The versioning component 306 determines a current version of the content 308. For example, the versioning component 306 can make a simple determination as to the status of the content, such as "current" or "not current." In addition, the versioning component can make more sophisticated determinations of the status of the content, such as assigning version numbers or indicators. The versioning component 306 can include a monitor component 310 that continuously, periodically, and/or dynamically monitors the content 308 for updates, modifications, or other changes. The monitor component 310 can merely determine that the content 308 has changed, or can determine the particular sections (e.g., lines, portions, etc.) of the content 308 that have been modified. For instance, a user may desire only to update a relatively small section (e.g., a couple of command lines) of the content 308, and the monitor component 310 can compare the previous version of the content 308 to the current version of the content 308 to determine the modified sections.

The versioning component 306 can also include a notification component 312 that notifies one or more targets of modified content 308. For instance, when a modification to the content 308 is detected by the monitor component 310, the notification component 312 can transmit a message or indicator to an electronic operator interface (EOI) indicating that the content 308 has been changed. In addition, the notification component 312 can transmit (e.g., upload) the updated content 308, or at least the updated section of the content 308, to the EOI for storage (e.g., backup). For instance, the notification component 312 can transmit a new version message to one or more targets, and upon receipt of an acknowledgement can transmit the content 308 to the targets. Additionally or alternatively, the notification component 312 can facilitate the EOI in obtaining the content 308 from the controller 302 (discussed below).

In addition, the controller 302 can include a controller security component 314. The controller security component 314 restricts access to the content 308. For instance, the controller security component can require users or other devices (e.g., EOI, etc.) to submit one or more security credentials before providing access to the content 308. The security credentials can include a username, a password, a unique identifier, and so forth. Additionally or alternatively, the controller security component 314 can provide one or more security credentials necessary to access another device. For instance, the controller 302 may desire to backup the content 308 in a communicatively connected EOI (not shown), wherein the controller security component 314 can provide the necessary security credentials to access the EOI (discussed in greater detail below).

Figure 4:
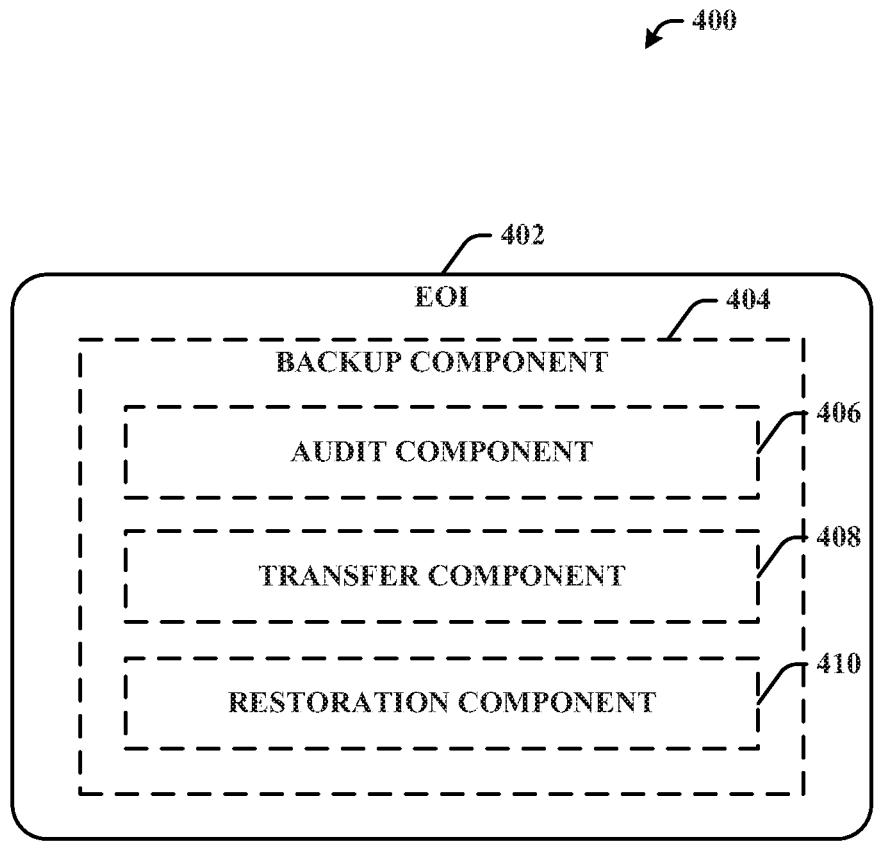
FIG. 4 illustrates an example general component block diagram of an electronic operator interface in accordance with the present specification.

FIG. 4 illustrates an example electronic operator interface in accordance with an embodiment of the subject innovation. The electronic operator interface (EOI) 402 can include virtually any operator interface suitable for communication with a controller, such as a touch screen display, a control panel, an instrument panel, and so forth. For instance, the EOI 402 can be a touch screen display that enables an operator to adjust or otherwise input one or more control aspects (e.g., set-points, recipes, etc.) for execution by one or more controllers. In addition, the EOI 402 can communicate with a plurality of Input/Output devices, or network devices (discussed infra).

The EOI 402 can include a backup component 404 having an audit component 406, a transfer component 408, and a restoration component 410. As discussed previously, the backup component 404 enables the EOI 402 to automatically download and restore content from the controllers (see FIGS. 2-3). The audit component 406 can determine, identify, or otherwise detect modifications to controller content. For instance, a controller can include a set of computer executable instructions that detail operation of a plurality of industrial machines and processes in connection with a manufacturing process. At various times, the computer executable instructions can be modified by one or more users for improved performance, changing conditions, business policies, user preferences, general updates, and so forth. The audit component 406 can examine the content at predetermined intervals (e.g., daily, weekly, etc.), or dynamically in order to detect changes. For instance, the audit component 406 can detect when the controller is placed in a mode that allows the content to be modified, and inspect the content for changes based on the mode. Additionally or alternatively, the audit component 406 can obtain a notification from the controller that the content has been modified (as discussed previously). Moreover, the audit component 406 can detect the modifications to the computer executable instructions with varying levels of granularity. For example, the audit component 406 can determine that a modification to the instructions has occurred, or the audit component can detect the specific portions (e.g., section, lines of code, etc.) that have been modified. Similarly, the audit component 406 can determine that a controller does not have the most recent version of the content. For example, if a controller containing the most recent version of the content fails, and is subsequently replaced with a different controller, then audit component 406 can determine that the new controller does not contain any content.

The transfer component 408 can download, retrieve, or otherwise obtain the modified content from the controller based on the determination by the audit component 406. Once the modified content has been obtained it can be stored on the EOI, for example, the content can be stored on a hard drive, flash memory, and so forth located in the EOI (discussed infra). The transfer component 408 can communicate with the controller via any suitable communication protocol, including but not limited to LAN, WLAN, global communication network (e.g., such as the Internet), an Ethernet connection, a proprietary communication protocol, etc.

The restoration component 410 can obtain the most recent version of the content (e.g., from the EOI), and transmit, download, or otherwise communicate the content to one or more controllers based on a determination by the audit component 406. For instance, if the audit component 406 determines that the controller does not have the most recent version of the content, then the restoration component 410 can obtain the most recent version of the content (e.g., stored on the EOI) and communicate it to the controller. The transfer component 408 can communicate with the controller via any suitable communication protocol, including but not limited to LAN, WLAN, global communication network (e.g., such as the Internet), an Ethernet connection, a proprietary communication protocol, and so forth.

Figure 5:
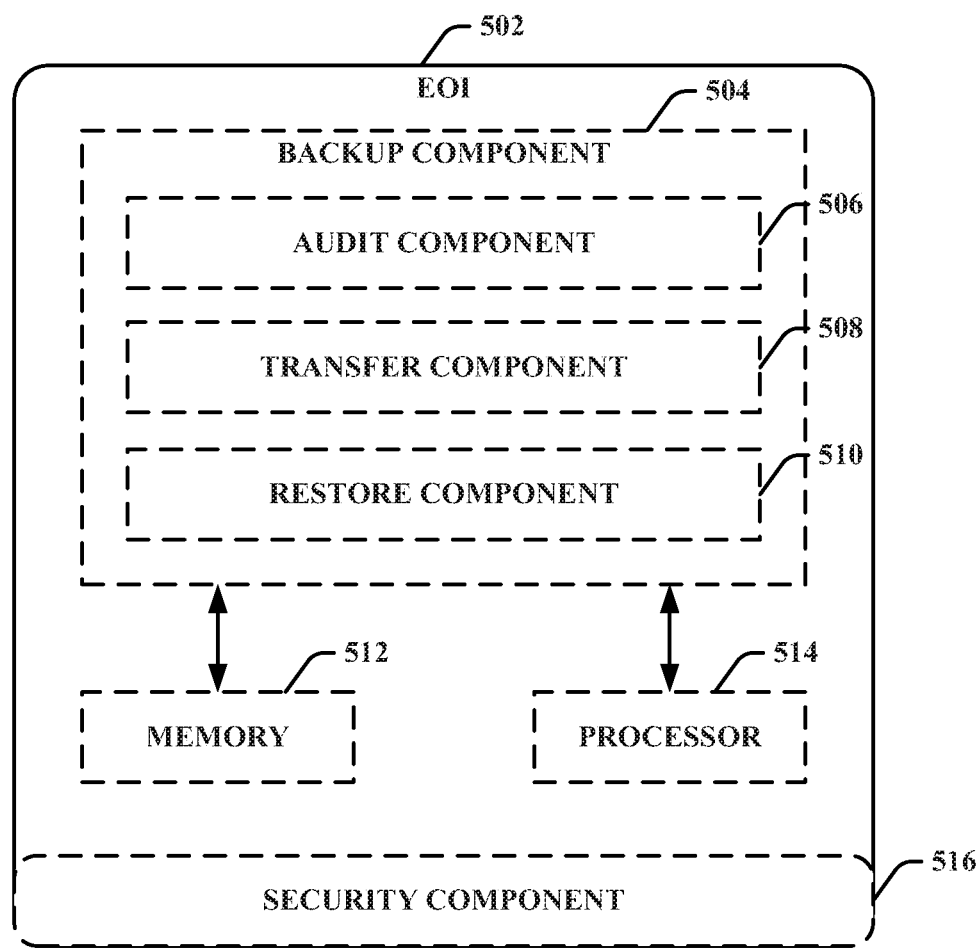
FIG. 5 illustrates an example general component block diagram of an electronic operator interface in accordance with the present specification.

Additionally or alternatively, the backup component 404 can download and restore data (e.g., configuration data, etc.) from one or more I/O devices, or other devices communicatively connected to the EOI 402 via a network (e.g., network devices). For example, the EOI 402 can be communicatively connected to a network card (e.g., I/O device), and the backup component 404 can backup configuration data obtained from the network card. Moreover, in the event that the network card fails or loses its configuration data, the backup component 404 can automatically restore the network card's configuration data. It is to be appreciated that this is but one example, and a plurality of embodiments may be possible within the scope and spirit of the subject innovation FIG. 5 illustrates a system that facilitates automatically storing and backing-up controller content via an electronic operator interface in accordance with an aspect of the current innovation. The system includes an electronic operator interface (EOI) 502 having a backup component 504 that automatically downloads and/or restores content from one or more controllers. As discussed previously, the backup component 504 includes an audit component 506, a transfer component 508, and a restoration component 510. The audit component 506 can determine, identify, or otherwise detect modifications to controller content and/or a lack of controller content. In addition, the transfer component 508 can download, retrieve, or otherwise obtain the modified content from the controller based on the determination by the audit component 506. While, the restoration component 510 obtains the most recent version of the content (e.g., from the EOI), and transmits, downloads, or otherwise communicates the content to one or more controllers based on a determination by the audit component 506.

System 500 can additionally comprise memory 512 that is operatively coupled to the backup component 504 and that stores information related to operator interfaces, controller content and any other suitable information related to providing automatic backup and/or restoration of controller content. A processor 514 can be operatively connected to the backup component 504 (and/or memory 512) to facilitate storing and/or communicating controller content and the like. It is to be appreciated that processor 514 can be a processor dedicated to analyzing and/or generating information received by the backup component 504, a processor that controls one or more components of system 500, and/or a processor that both analyzes and generates information received by backup component 504 and controls one or more components of system 500.

In addition, the EOI 502 can include a security component 516 that restricts access by users to the EOI 502. For instance, the security component 516 can require users to input security credentials to access the EOI 502. The security credentials can include a username, a password, a biometric identifier (e.g., voice, fingerprint, facial recognition, etc.), and so forth. The security component 516 can grant users access to the EOI 502 with varying levels of granularity. For instance, a standard user may only have access to a predetermined subset of the EOI's 502 functionality, while an administrator can have unlimited access. Similarly, the security component 516 can require receipt of one or more security credentials from a controller attempting to access the backup component 504. For instance, a controller may be required to submit a set of security credentials to the security component 516 prior to the backup component 504 accepting data from the controller. As an alternative example, a controller can require security credentials before granting access to its content. In this case, the security component 516 can determine the security credentials necessary for access, and supply them to the controller prior to attempting back-up of the controller content. It is to be appreciated that these are but a few examples; and those skilled in the art will be able to readily identify equivalent embodiments within the scope and spirit of the subject innovation.

Figure 6:
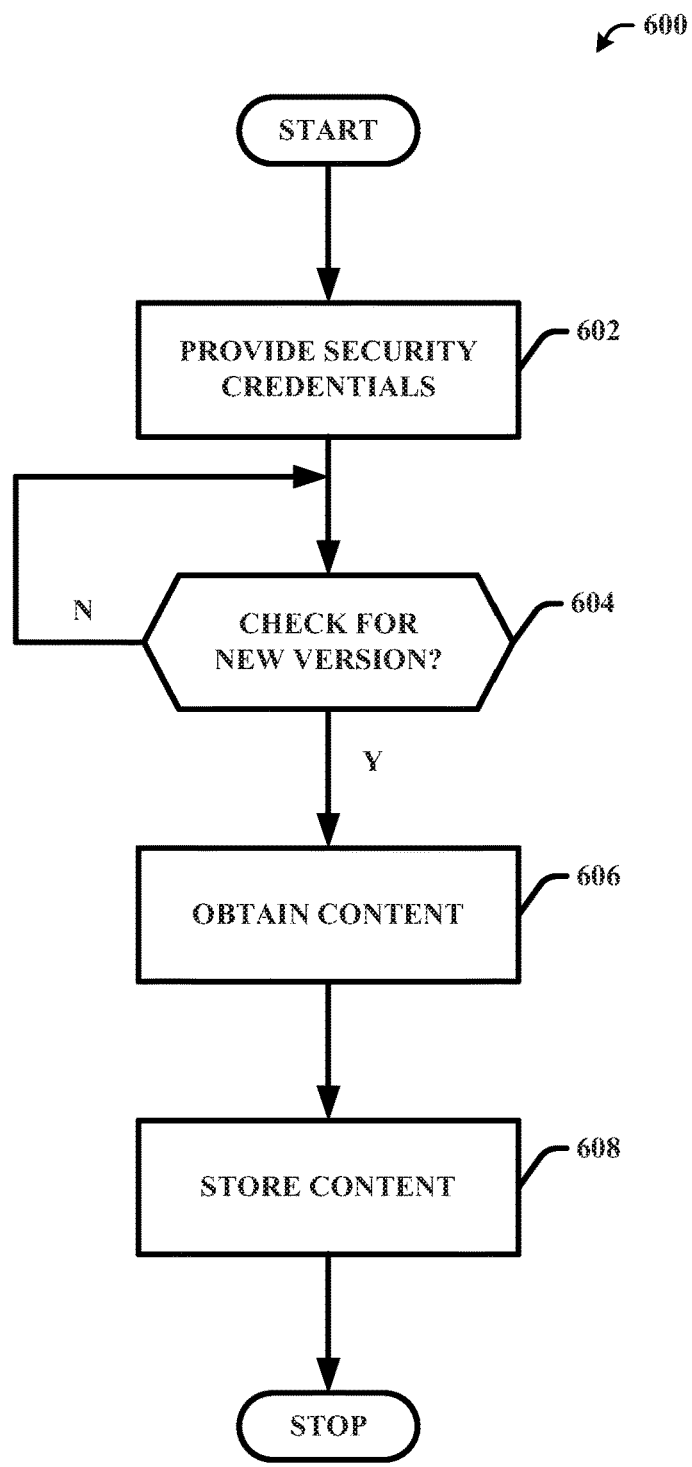
FIG. 6 illustrates an example methodology for automatically backing up controller content via an electronic operator interface in accordance with the present specification.
Figure 7:
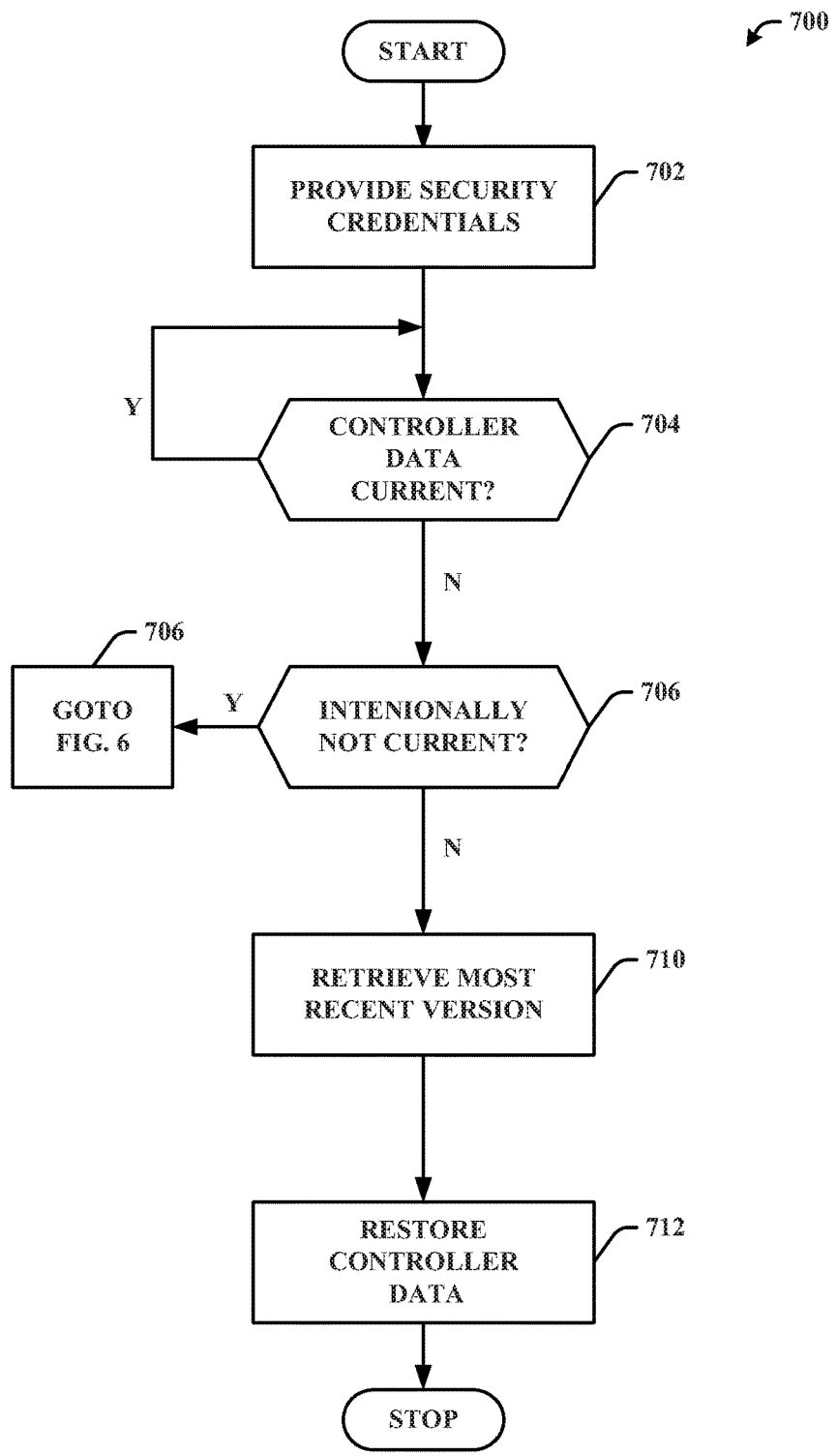
FIG. 7 illustrates an example methodology of automatically restoring controller content via an electronic operator interface in accordance with the present specification.

In view of the example systems described supra, methodologies that may be implemented in accordance with the disclosed subject matter will be better appreciated with reference to the flow charts of FIGS. 6-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Turning to FIG. 6, an example methodology for automatically backing up controller content via an electronic operator interface is shown in accordance with an aspect of the subject innovation. At 602, an electronic operator interface can provide one or more security credentials to a controller. As discussed previously, the security credentials can include a password, a username, a unique identifier, etc. If the security credentials are verified, then the method advances to 604. For instance, the controller can maintain a list of trusted security credentials in a data store, wherein the controller will compare the security credentials obtained from the electronic operator interface to the trusted security credentials in the data store. If the credentials match, then the controller will allow the EOI to access its data.

At 604, a determination is made as to whether there has been any change in the controller content. The controller content can include but is not limited to ladder diagrams, function block diagrams, structured text, sequential function charts, computer executable code, text files, databases, and so forth. For example, the controller content can be a set of computer executable codes, and a determination can be made as to whether the code has been modified, updated, or otherwise changed. If the controller content has not been changed (N at 602), then the method returns to beginning to check again for changes to the content. Changes in the controller content can be determined periodically and/or dynamically. For example, the method 600 can include checking the content on weekly basis, or based on one or more criteria that indicate the content may have been changed (e.g., mode changes, operation changes, failure, etc.).

If the content has been modified, then at 606 the modified content is obtained. A plurality of means can be employed to obtain the content from the controller. For instance, most any suitable communication protocol can be used to communicate with the controller, including but not limited to LAN, WLAN, global communication network (e.g., such as the Internet), an Ethernet connection, a proprietary communication protocol, and so forth.

At 608, the content can be stored in an electronic operator interface (EOI). For example, the EOI can include a data store comprised of a hard drive, flash memory, and so forth. The data store can be a dedicated data store for saving the most recent version of the content, or the data store can be a general purpose data store that also maintains data relating to the operation of the EOI.

FIG. 7 illustrates an example methodology of automatically restoring controller content via an electronic operator interface in accordance with an aspect of the current innovation. At 702, an electronic operator interface can provide one or more security credentials to one or more controllers. As discussed previously, the security credentials can include a password, a username, a unique identifier, etc. If the security credentials are verified, then the method advances to 704. For instance, the controller can maintain a set of verified security credentials in a data store, wherein the controller will compare the security credentials obtained from the electronic operator interface (EOI) to the set of verified security credentials in the data store. If the credentials obtained from the EOI match the verified security credentials in the data store, then the controller will allow the EOI to access its data.

At 704, a determination is made as to whether the controller's content is current. For example, the content on the controller may have been accidentally overwritten, or the controller may have been replaced with a controller that does not contain the necessary content. If the content is current, then the method returns to beginning and can make the determination again at a later time. For instance, the determination can be made periodically (e.g., weekly, monthly, etc.), or dynamically based on one or more indicators (e.g., mode changes, operation change, etc.) that the controller content is not current.

At 706, a determination is made as to whether the controller content is intentionally not current. For instance, a user may desire to remove the content for a plurality of reasons, such as modification. At 708, if the content is intentionally not the same as the most recent backed-up version, then the method proceeds to FIG. 6. At 710, if it is determined that the operational data on the controller is not current, and a user has not intentionally set the operational data this way, then the most recent backed-up version of the data is obtained, read from memory, or otherwise retrieved. For example, the back-up operational data can be maintained in a dedicated data store in an EOI.

At 712, the data is restored to controller. For instance, the data can include one or more sets of instructions used by the controller to instruct, direct, or otherwise control one or more electronic, mechanical, and/or electromechanical processes or machines. The data can be communicated to the controller via a plurality of means, such as LAN, WLAN, global communication network (e.g., such as the Internet), an Ethernet connection, a proprietary communication protocol, and so forth.

Figure 8:
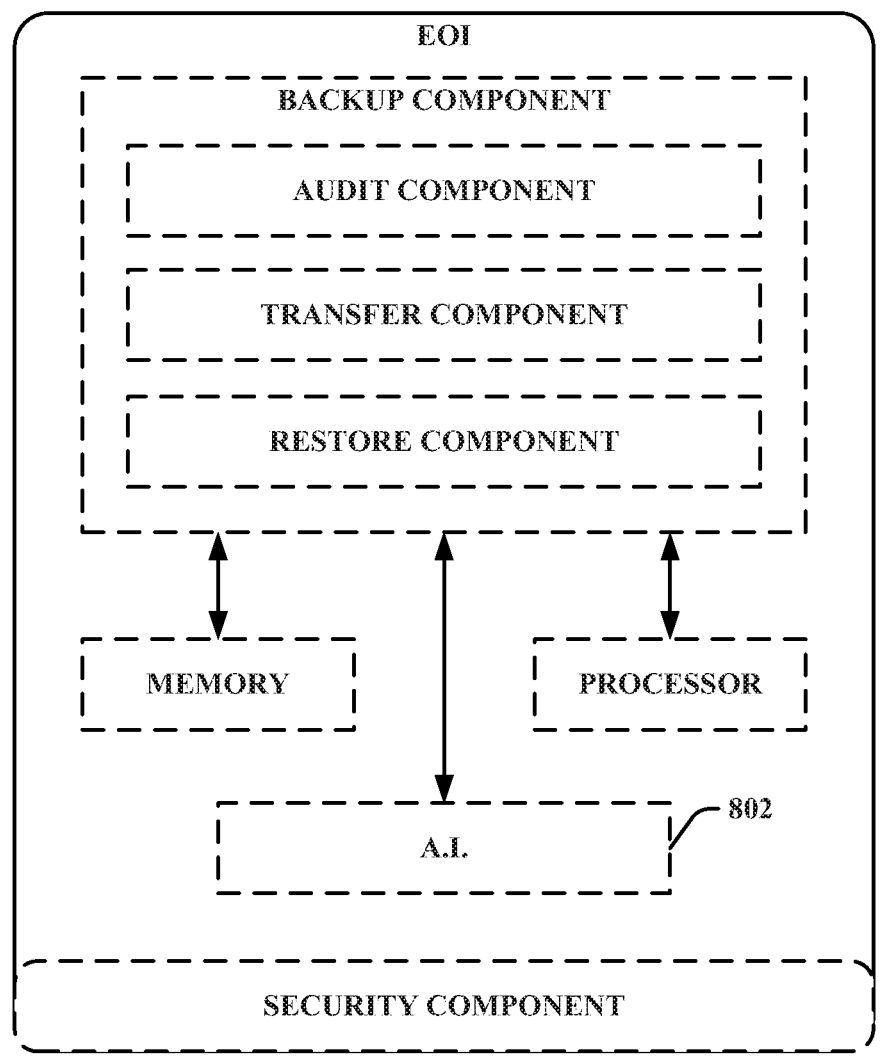
FIG. 8 illustrates a system that employs an artificial intelligence component which facilitates automating one or more features in accordance with the present specification.

FIG. 8 illustrates a system 800 that employs an artificial intelligence (AI) component 802 which facilitates automating one or more features in accordance with the subject innovation. The subject innovation (e.g., in connection with inferring) can employ various AI-based schemes for carrying out various aspects thereof. For example, a process for determining if the controller content (e.g., control data, etc.) has been modified, updated, or deleted can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 9:
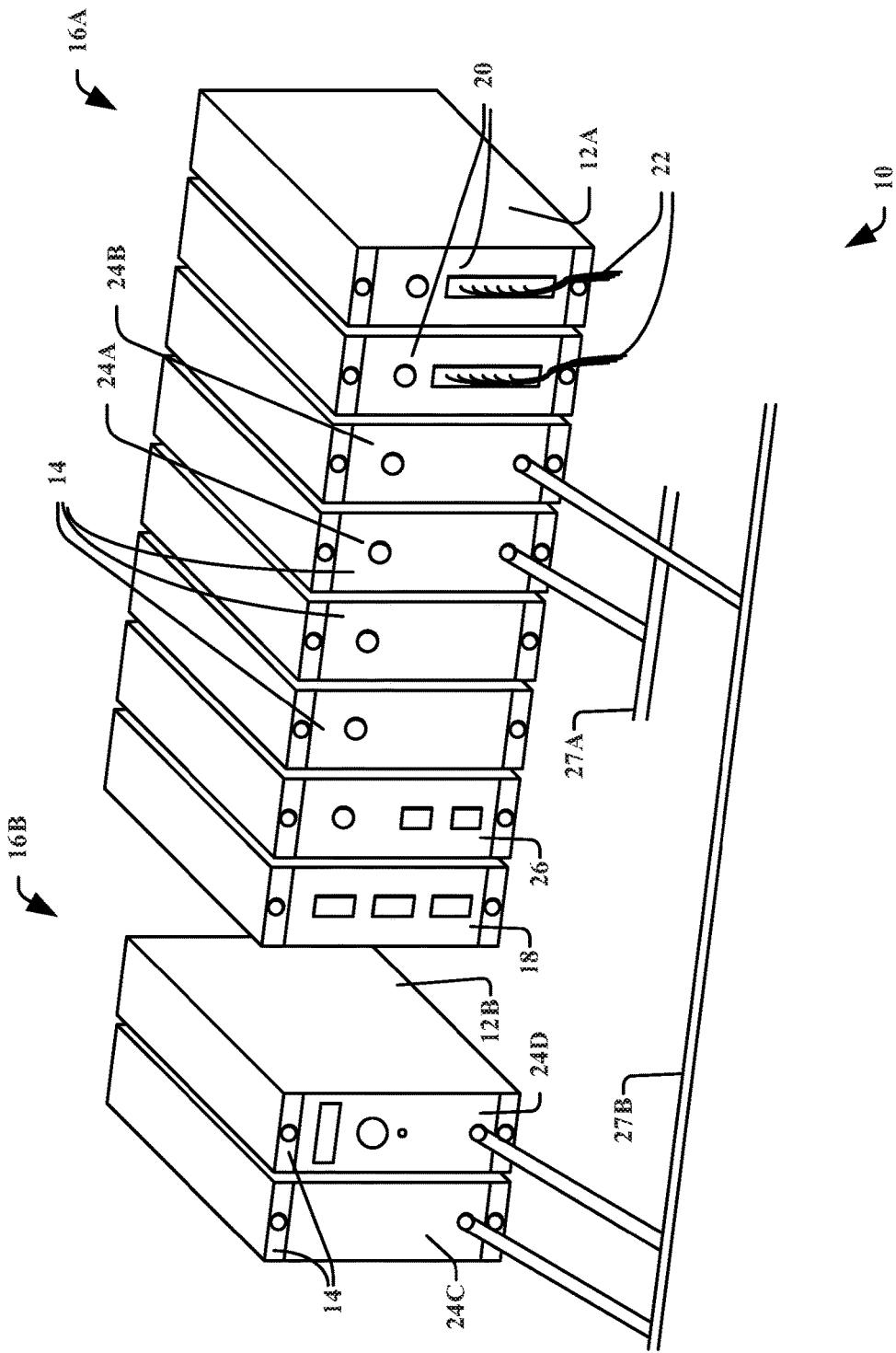
FIG. 9 is a perspective view illustrating an example industrial controller having multiple functional modules contained in several racks joined by communication links in accordance with an aspect of the present specification.

Referring to FIG. 9, a distributed industrial control system 10 (e.g., controller) suitable for use with the present invention provides a first and second rack 12A and 12B for holding a number of functional modules 14 electrically interconnected by backplanes 16A and 16B running along the rear of the racks 12A and 12B respectively. Each module 14 may be individually removed from the rack 12A or 12B thereby disconnecting it from its respective backplane 16 as will be described below for repair or replacement and to allow custom configuration of the distributed system 10.

The modules 14 within the rack 12A may include, for example, a power supply module 18, a processor module 26, two communication modules 24A and 24B and two I/O modules 20. A power supply module 18 receives an external source of power (not shown) and provides regulated voltages to the other modules 14 by means of conductors on the backplane 16A.

The I/O modules 20 provide an interface between inputs from, and outputs to external equipment (not shown) via cabling 22 attached to the I/O modules 20 at terminals on their front panels. The I/O modules 20 convert input signals on the cables 22 into digital words for transmission on the backplane 16A. The I/O modules 20 also convert other digital words from the backplane 16A to the necessary signal levels for control of equipment.

The communication modules 24A and 24B provide a similar interface between the backplane 16A and one of two external high speed communication networks 27A and 27B. The high speed communication networks 27A and 27B may connect with other modules 14 or with remote racks of I/O modules 20 or the like. In the example illustrated, the high speed communication network 27A connects with backplane 16A via the communication module 24A, whereas the high speed communication network 27B connects the communication module 24B with communication modules 24C and 24D in rack 12B.

The processor module 26 processes information provided by the communication modules 24A and 24B and the I/O modules 20 according to a stored program and provides output information to the communication module 24 and the I/O modules 20 in response to that stored program and received input messages.

Figure 10:
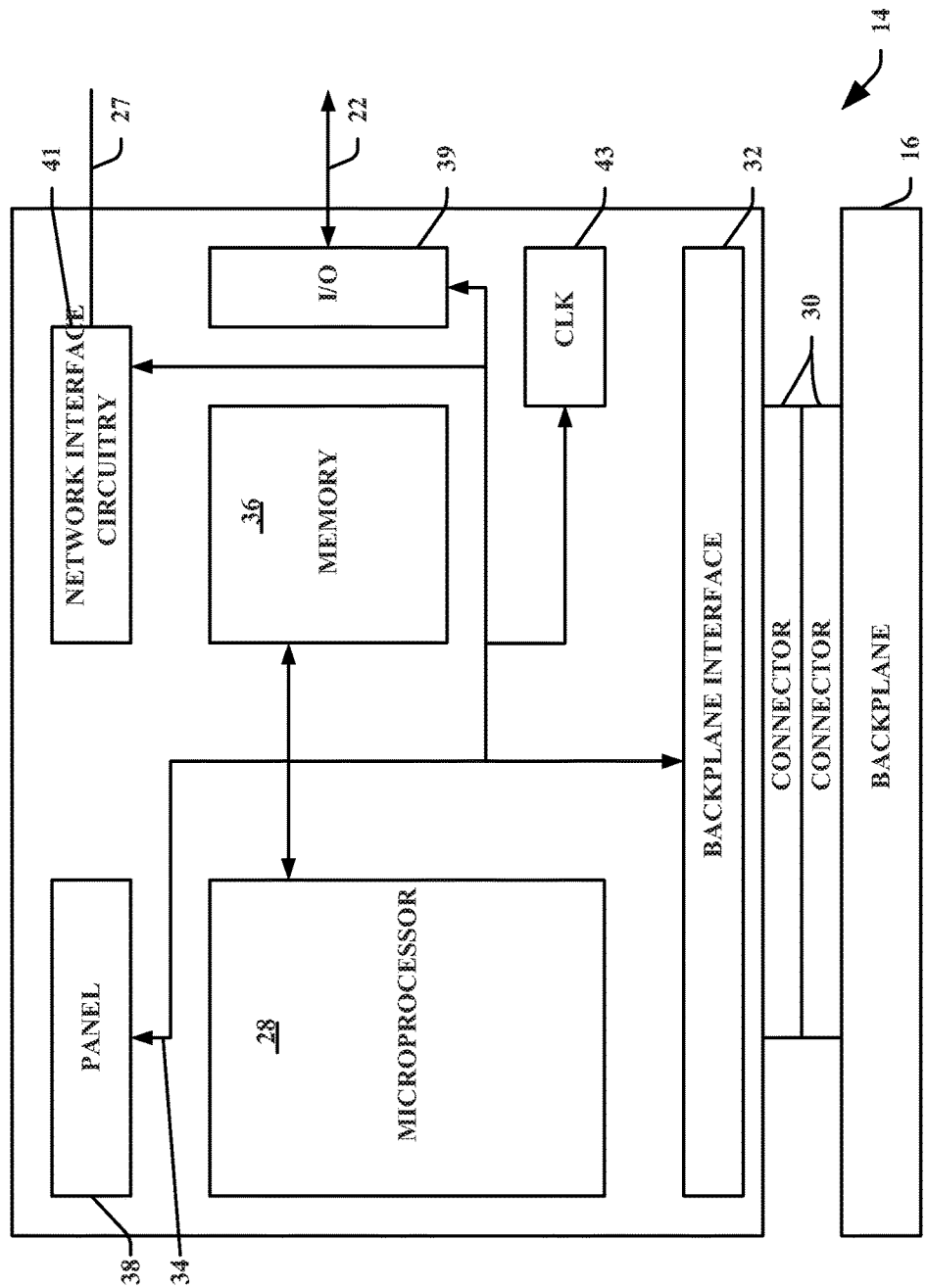
FIG. 10 is a schematic block diagram of an example single functional module of illustrating the connection to a common backplane and communication links to communicate with other modules in accordance with an aspect of the present specification.

Referring also to FIG. 10, each functional module 14, is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14.

Local communication with the other modules 14 through the backplane 16 is accomplished by means of a backplane interface 32 which electrically connects the backplane 16 through connector 30. The backplane interface 32 monitors messages on the backplane 16 to identify those messages intended for the particular module 14, based on a message address being part of the message and indicating the message's destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication network interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external precision clock 43 of improved precision. This clock 43 may be a crystal controlled oscillator or other time standard including a radio link to an NBS time standard. The precision of the clock 43 is recorded in the memory 36 as a quality factor. The panel circuitry 38 includes status indication lights such as are well known in the art and manually operable switches such as for locking the module 14 in the off state.

The memory 36 holds programs executed by the microprocessor 28 to provide the functions as will be described and also variables and data necessary for the execution of those programs. For I/O modules 20, the memory 36 also includes an I/O table holding the current state of inputs and outputs received from and transmitted to the industrial controller 10 via the I/O modules 20.

Figure 11:
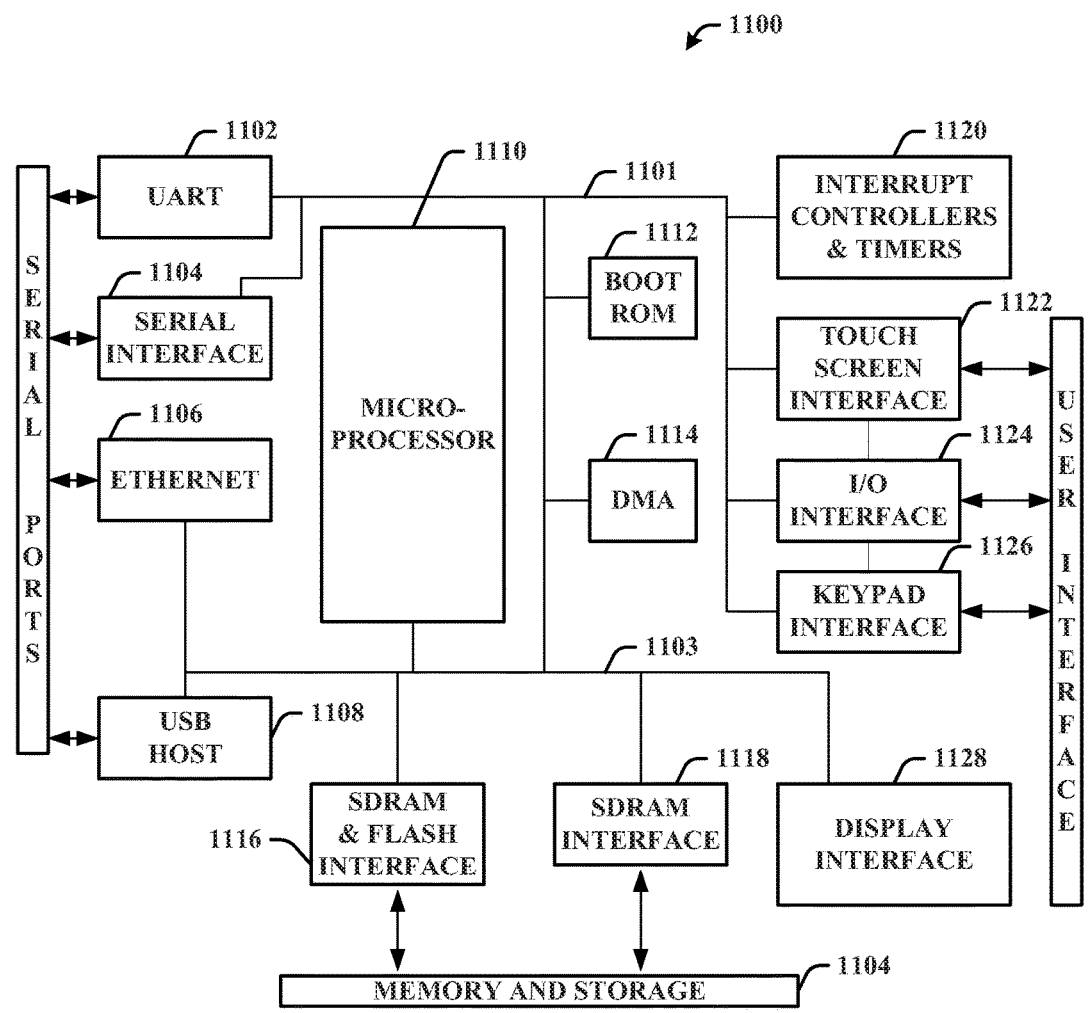
FIG. 11 is a general component block diagram illustrating an example electronic operator interface in accordance with an aspect of the present specification.

Referring now to FIG. 11, a general component block diagram of an example electronic operator interface is shown in accordance with an embodiment of the subject innovation. A plurality of devices are disposed on a peripheral bus 1101, including one or more universal asynchronous receiver-transmitters (UARTs) 1102, one or more serial interfaces 1104 for interfacing to external devices (such as digital-to-analog converters (DACs), audio controllers, and so on), interrupt controllers and timers 1120, a keypad interface 1126, one or more I/O ports 1124, and a touch screen interface 1122.

The electronic operator interface 1100 further includes a plurality of devices that are disposed on a processor bus 1103, such as a one or more universal serial bus (USB) host interfaces 1108 for connection to USB devices such as a keyboard, mouse, printer, and so forth, an Ethernet port 1106, DMA controllers 1114, a microprocessor 1110, a display interface 1128 (e.g., raster engine), memory controllers 1116 and 1118, and boot ROM 1112 for storing program code executed during a boot-up sequence. It is to be appreciated that this is but a single example, and those skilled in the art will be able to readily identify additional equivalent embodiments within the scope and spirit of the subject innovation.

It is to be appreciated that this is only a single example, and a plurality of configurations are possible within the scope and spirit of the subject innovation. For example, the EOI 1202 can be used in conjunction with non-rack mounted controllers, or the controller can be included in the EOI 1202.

Figure 12:
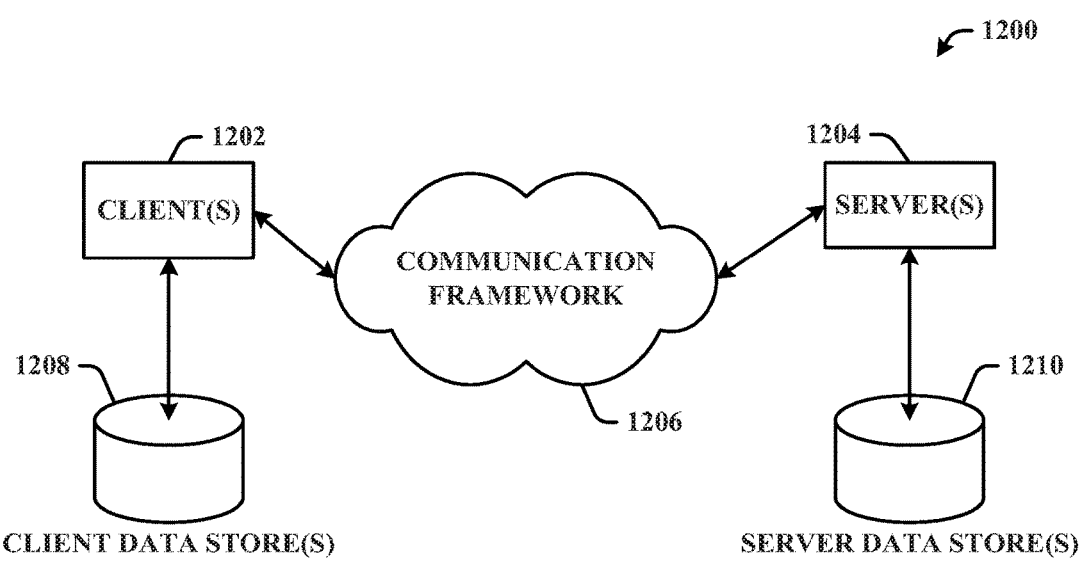
FIG. 12 is a schematic block diagram of a sample-computing environment with which the subject specification can interact.

Referring now to FIG. 12, there is illustrated a schematic block diagram of an example computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   in response to automation content being updated to updated automation content, receiving, by an electronic operator interface comprising a processor, the updated automation content; and
   in response to the electronic operator interface determining that at least a portion of the updated automation content that had been stored in an industrial controller is not stored in the industrial controller, automatically communicating, by the electronic operator interface, at least the portion of the updated automation content to the industrial controller to restore at least the portion of the updated automation content to the industrial controller.

2. The method of claim 1, wherein the receiving comprises receiving, by the electronic operator interface, the updated automation content from a communication device or the industrial controller, wherein the communication device is associated with an industrial automation design or configuration environment, and wherein the receiving occurs at a time at least one of the updated automation content is stored in the industrial controller or prior to determining that at least the portion of the updated automation content is not stored or is no longer stored in the industrial controller.

3. The method of claim 2, wherein at least one of:
   the receiving comprises receiving, by the electronic operator interface, the updated automation content from the communication device or the industrial controller via a first wireless communication connection or a first wired communication connection; or
   the communicating comprises communicating, by the electronic operator interface, at least the portion of the updated automation content to the industrial controller via a second wireless communication connection or a second wired communication connection.

4. The method of claim 1, further comprising:
   determining, by the electronic operator interface, that at least the portion of the updated automation content that had been stored in the industrial controller is no longer stored in the industrial controller, wherein the communicating comprises communicating, by the electronic operator interface, at least the portion of the updated automation content to the industrial controller, in response to determining that at least the portion of the updated automation content that had been stored in the industrial controller is no longer stored in the industrial controller.

5. The method of claim 1, further comprising:
   storing, by the electronic operator interface, the updated automation content in a memory associated with the electronic operator interface, wherein, for a period of time that occurs between the receiving the updated automation content and the determining that at least the portion of the updated automation content is not stored in the industrial controller, a first copy of the updated automation content is stored in the memory associated with the electronic operator interface and a second copy of the updated automation content is stored in the industrial controller.

6. The method of claim 1, wherein at least one of the automation content or the updated automation content comprises at least one of computer-executable code, control logic data, ladder diagram data, function block diagram data, structured text data, sequential function chart data, a text file, instruction data, programming language data, application data of an application, or a data set of a database, relating to an industrial automation system.

7. The method of claim 1, further comprising:
detecting, by the electronic operator interface, that the industrial controller is placed in a mode that enables the automation content to be updated to the updated automation content;
in response to detecting that the industrial controller is placed in the mode, examining, by the electronic operator interface, content of the industrial controller to facilitate determining whether the automation content has been modified to the updated automation content; and
determining, by the electronic operator interface, whether the automation content has been updated to the updated automation content based at least in part on a result of the examining.

8. The method of claim 7, further comprising:
at least one of:
determining, by the electronic operator interface, that the automation content has not been updated based at least in part on the result of the examining; or
determining, by the electronic operator interface, that the automation content has been updated to the updated automation content based at least in part on the result of the examining, wherein the receiving comprises receiving, by the electronic operator interface, the updated automation content from the industrial controller.

9. The method of claim 1, further comprising:
determining, by the electronic operator interface, that the automation content stored in the industrial controller has been updated to the updated automation content based at least in part on a notification received by the electronic operator interface, wherein the receiving comprises receiving, by the electronic operator interface, the updated automation content from the industrial controller in connection with the notification.

10. The method of claim 1, further comprising:
receiving, by the electronic operator interface, data from at least one of an input/output device or a network device associated with an industrial system, wherein the data comprises configuration data;
storing, by the electronic operator interface, the data in a memory associated with the electronic operator interface to facilitate backing up the data; and
in response to subsequently determining that the data is no longer stored in at least one of the input/output device or the network device, communicating, by the electronic operator interface, the data to at least one of the input/output device or the network device to restore the data to at least one of the input/output device or the network device.

11. A system, comprising:
a memory storing executable instructions; and
a processor, coupled to the memory, that executes or facilitates execution of the executable instructions to facilitate performance of operations, the operations comprising:
in response to control data being modified to modified control data, receiving the modified control data; and
automatically communicating a portion of the modified control data to an industrial controller, in response to a determination, by an electronic operator interface, that the portion of the modified control data that had been stored in an industrial controller is not stored in the industrial controller, to restore the portion of the modified control data to the industrial controller.

12. The system of claim 11, wherein the operations further comprise:
storing the modified control data in a data store associated with the electronic operator interface, wherein, for a period of time that occurs between the receiving the modified control data and the determination that at least the portion of the modified control data is not stored in the industrial controller, a first copy of the modified control data is stored in the data store associated with the electronic operator interface and a second copy of the modified control data is stored in the industrial controller.

13. The system of claim 11, wherein the receiving comprises receiving the modified control data from a device or the industrial controller, wherein the device is associated with an industrial automation design or configuration environment, and wherein the receiving occurs at a time at least one of the modified control data is stored in the industrial controller or prior to at least the portion of the modified control data being determined to not be stored or to no longer be stored in the industrial controller.

14. The system of claim 11, wherein the receiving comprises receiving, via the electronic operator interface, the modified control data from a device associated with an industrial automation design or configuration environment, in connection with the industrial controller receiving the modified control data from the device.

15. The system of claim 11, wherein the operations further comprise:
determining that at least the portion of the modified control data that had been stored in the industrial controller is no longer stored in the industrial controller, wherein the communicating comprises communicating, by the electronic operator interface, at least the portion of the modified control data to the industrial controller, in response to determining that at least the portion of the modified control data that had been stored in the industrial controller is no longer stored in the industrial controller.

16. The system of claim 11, wherein at least one of the control data or the modified control data comprises at least one of computer-executable code, control logic data, ladder diagram data, function block diagram data, structured text data, sequential function chart data, a text file, instruction data, programming language data, application data of an application, or a data set of a database, relating to an industrial automation system.

17. The system of claim 11, wherein the electronic operator interface comprises or is associated with at least one of a human machine interface or a graphics display.

18. The system of claim 11, wherein at least one of the receiving of the modified control data or the communicating of the portion of the modified control data is performed via at least one of a wireless communication connection or a wired communication connection using at least one of a local area network, a wireless local area network, a global communication network, an intranet, an Ethernet connection, or a communication protocol that is compatible with the electronic operator interface.

19. A machine-readable storage medium storing computer-executable instructions that, in response to execution, cause a system comprising a processor to perform operations, comprising:

at a first time, in response to control information being determined to be modified control information, acquiring the modified control information from a device or an industrial controller; and at a second time, in response to an electronic operator interface determining that at least a portion of the modified control information that had been stored in the industrial controller is not stored or is no longer stored in the industrial controller, automatically transmitting, via the electronic operator interface, at least the portion of the modified control information to the industrial controller to restore at least the portion of the modified control information to the industrial controller.

20. The machine-readable storage medium of claim 19, wherein the operations further comprise:

storing the modified control information in a data store associated with the electronic operator interface, wherein, for a period of time that occurs between the first time and the second time, a first copy of the modified control information is stored in the data store and a second copy of the modified control information is stored in the industrial controller.

* * * * *